(12) United States Patent
Sandhu

(10) Patent No.: US 7,799,196 B2
(45) Date of Patent: Sep. 21, 2010

(54) METHODS AND APPARATUS FOR SORTING AND/OR DEPOSITING NANOTUBES

(75) Inventor: Gurtej S. Sandhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 1212 days.

(21) Appl. No.: 11/217,170

(22) Filed: Sep. 1, 2005

(65) Prior Publication Data

US 2007/0045119 A1 Mar. 1, 2007

(51) Int. Cl.
C25D 13/12 (2006.01)
(52) U.S. Cl. ...................... 204/490; 204/547
(58) Field of Classification Search .................. 204/490, 204/547
See application file for complete search history.

(56) References Cited

U.S. PATENT DOCUMENTS

| 6,280,677 | B1 | 8/2001 | Yakobson | |
|---|---|---|---|---|
| 6,664,727 | B2 | 12/2003 | Nakamoto | |
| 6,911,682 | B2 | 6/2005 | Rueckes et al. | |
| 6,914,381 | B2 | 7/2005 | Okai et al. | |
| 6,919,592 | B2 | 7/2005 | Segal et al. | |
| 7,014,743 | B2 * | 3/2006 | Zhou et al. | 204/547 |
| 7,335,258 | B2 * | 2/2008 | Zhang et al. | 117/68 |
| 7,455,757 | B2 * | 11/2008 | Oh et al. | 204/490 |
| 2004/0045817 | A1 | 3/2004 | Choi et al. | |

FOREIGN PATENT DOCUMENTS

WO WO-01/03208 A1 1/2001

OTHER PUBLICATIONS

Bower, C. et al. "Plasma-induced alignment of carbon nanotubes," abstract only, Applied Physics Letters, Aug. 7, 2000, vol. 77, Issue 6, pp. 830-832.
Ren, Z.F., et al., "Synthesis of Large Arrays of Well-Aligned Carbon Nanotubes on Glass," abstract only, Science, vol. 282, Issue 5391, pp. 1105-1107, Nov. 6, 1998.
Yang, Q. et al., "Controlled Alignment of Carbon Nanotubes by Hot Filament Chemical Vapor Deposition in a CH4/H2 Plasma," abstract only, 2003 NSTI Nanotechnology Conference & Trade Show.

* cited by examiner

Primary Examiner—Kishor Mayekar
(74) Attorney, Agent, or Firm—Perkins Coie LLP

(57) ABSTRACT

Methods and apparatus for forming devices using nanotubes. In one embodiment, an apparatus for depositing nanotubes onto a workpiece comprises a vessel configured to contain a deposition fluid having a plurality of nanotubes including first nanotubes having a first characteristic and second nanotubes having a second characteristic. The apparatus further includes a sorting unit in the vessel configured to selectively isolate or otherwise sort the first nanotubes from the second nanotubes, and a field unit in the vessel configured to attach the first nanotubes to the workpiece. For example, the field unit can attach the first nanotubes to the workpiece such that the first nanotubes are at least generally parallel to each other and in a desired orientation relative to the workpiece.

31 Claims, 5 Drawing Sheets

METHODS AND APPARATUS FOR SORTING AND/OR DEPOSITING NANOTUBES

TECHNICAL FIELD

The present invention relates to methods and apparatus for sorting nanotubes and/or depositing nanotubes onto microfeature workpieces. Several embodiments of the invention are directed toward electrochemically depositing nanotubes in a desired arrangement relative to each other and/or a workpiece.

BACKGROUND

Nanotubes have one or more sheet-like matrices of carbon atoms configured into cylinders having one or more walls. Different types of nanotubes can have different properties. For example, nanotubes can be conductive, dielectric, or semiconductive. Nanotubes can accordingly be transistors, emitters, interconnects, or other components used in memory devices, displays, or other products. One challenge of using nanotubes is depositing the desired type of nanotubes onto a workpiece so that the nanotubes are in a desired configuration.

One process for depositing nanotubes onto a workpiece is to suspend the nanotubes in a solution, immerse the workpiece in the solution, and then remove the workpiece. After the workpiece is removed from the solution, the liquid evaporates and the nanotubes remain on the surface of the workpiece. The surface of the workpiece can have hydrophilic regions where the solution preferentially remains on the workpiece surface after removing the workpiece from the solution to deposit the nanotubes only on the hydrophilic regions. One drawback of this process is that the nanotubes are typically in a random configuration on the workpiece. Another problem with this process is that all the different types of nanotubes in the solution are typically deposited onto the surface of the workpiece. As such, this process may not provide the desired arrangement and/or types of nanotubes on a workpiece.

Chemical Vapor Deposition (CVD) processes similar to those used to deposit materials in the fabrication of semiconductor devices can be used to deposit nanotubes. CVD processes, however, also typically deposit the nanotubes in a random configuration. As such, one drawback of this process is that the nanotubes may not be arranged in the desired configuration on the workpiece.

Still another process for depositing nanotubes is to electroplate the nanotubes onto a workpiece. One such process immerses a workpiece in an electrolyte having a plurality of nanotubes and establishes an electrical field between the workpiece and a counter-electrode. The electrical field attaches the nanotubes to the workpiece such that the nanotubes are generally parallel to the direction of the electrical field. As a result, the nanotubes are typically parallel to each other and perpendicular to the workpiece. Although electroplating nanotubes onto workpieces can arrange the nanotubes in a desired configuration (e.g., parallel to each other), different types of nanotubes in a plating solution are generally plated onto the workpiece. As a result, undesired nanotubes may be deposited onto the workpiece along with desired nanotubes.

DETAILED DESCRIPTION

A. Overview

Figure 1:
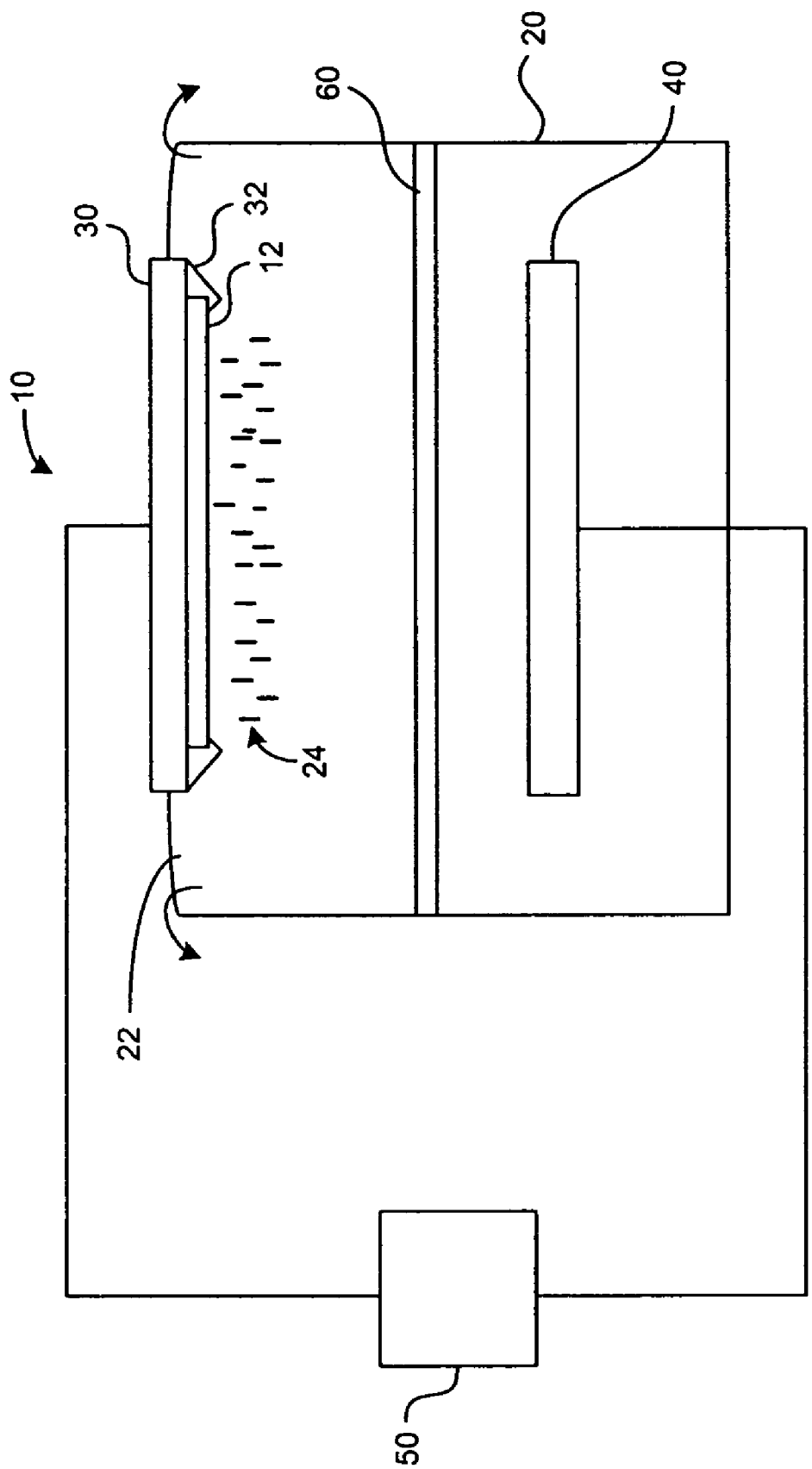
FIG. 1 is a schematic view illustrating a process for depositing nanotubes onto a workpiece in accordance with an embodiment of the invention.

The present invention is related to methods and apparatus for forming components using nanotubes. Several embodiments of the invention are directed toward sorting nanotubes so that selected nanotubes are deposited onto a workpiece. Other embodiments of the invention are directed toward controlling the alignment or other arrangement of the nanotubes on the workpiece. These different embodiments can also be combined such that the nanotubes are sorted and then deposited onto a microfeature workpiece in a desired configuration. As a result, several embodiments of the invention are expected to enable the fabrication of conductive lines, memory cells, emitters, transistors, interconnects, and other components in which it is desirable to deposit certain types of nanotubes in precise arrangements.

One embodiment of a method for depositing nanotubes onto a workpiece includes contacting a surface of the workpiece with a deposition fluid containing a plurality of nanotubes. This method continues by separating a first portion of the nanotubes from a second portion of the nanotubes in the deposition fluid, and establishing an electrical field between the surface of the workpiece and a counter-electrode in the deposition fluid. The electrical field electrochemically deposits at least one of the first portion of the nanotubes and/or the second portion of the nanotubes onto the workpiece.

Another method of depositing nanotubes onto a workpiece uses a deposition fluid containing first nanotubes having a first characteristic and second nanotubes having a second characteristic. This method comprises separating the first nanotubes from the second nanotubes, and electrochemically depositing the first nanotubes onto the workpiece. For example, the first nanotubes can be electrochemically deposited onto the workpiece by establishing an electrical field in the deposition fluid that drives the first nanotubes to the workpiece.

Yet another embodiment of a method for depositing nanotubes onto a workpiece comprises providing a deposition fluid containing first nanotubes having a first characteristic and second nanotubes having a second characteristic. This method further includes isolating the first nanotubes from the second nanotubes in the deposition fluid, and arranging the first nanotubes on the workpiece. The first nanotubes are arranged on the workpiece such that they are at least generally parallel to each other and in a desired orientation relative to the workpiece.

Another aspect of the invention is directed toward an apparatus for depositing nanotubes onto a workpiece. One embodiment of such an apparatus includes a vessel configured to contain a deposition solution having a plurality of nanotubes, a workpiece holder configured to hold a surface of the workpiece in a deposition zone relative to the vessel, and a counter-electrode in the vessel. The workpiece holder has at least one electrical contact configured to provide an electrical potential to the workpiece such that the workpiece defines another electrode. As a result, when the processing solution is in the vessel, an electrical bias can be applied to the workpiece and the counter-electrode to establish an electrical field in the deposition solution. This embodiment of the apparatus further includes a nanotube separator in the vessel configured to sort a first portion of the nanotubes from a second portion of the nanotubes.

Another embodiment of an apparatus for depositing nanotubes onto a workpiece in accordance with the invention comprises a vessel configured to contain a deposition fluid having a plurality of nanotubes including first nanotubes having a first characteristic and second nanotubes having a second characteristic. The apparatus further includes a sorting unit in the vessel configured to selectively isolate the first nanotubes from the second nanotubes and a field unit in the vessel configured to attach the first nanotubes to the workpiece such that the first nanotubes are at least generally parallel to each other and in a desired orientation relative to the workpiece.

Another embodiment of an apparatus for depositing nanotubes onto a workpiece in accordance with the invention comprises a vessel configured to contain a deposition solution having a plurality of nanotubes and means for isolating a first portion of the nanotubes from a second portion of the nanotubes. The apparatus further includes means for electrochemically attaching the first portion of the nanotubes to the workpiece such that the nanotubes are at least generally parallel to each other and in a desired orientation relative to the workpiece.

FIGS. 1-5 illustrate several embodiments of methods and apparatus for sorting nanotubes and/or depositing nanotubes onto microfeature workpieces in a desired arrangement in accordance with various embodiments of the invention. Specific details of the invention are set forth in the following description and in FIGS. 1-5 to provide a thorough understanding of these embodiments of the invention. One skilled in the art, however, will understand that the present invention may have additional embodiments, or that other embodiments of the invention may be practiced without several of the specific features explained in the following description. The term "microfeature workpiece" is used throughout to include substrates upon which and/or in which microelectronic devices, micromechanical devices, data storage elements, optics, and other features are fabricated. For example, microfeature workpieces can be semiconductor wafers, glass substrates, dielectric substrates, or many other types of substrates. Many features on such microfeature workpieces have critical dimensions less than or equal to 1 μm, and in many applications the critical dimensions of the smaller features are less than 0.25 μm or even less than 0.1 μm. Furthermore, the terms "planarization" and "planarizing" mean forming a planar surface, forming a smooth surface (e.g., "polishing"), or otherwise removing materials from workpieces. Where the context permits, singular or plural terms may include the plural or singular terms, respectively. Moreover, unless the word "or" is expressly limited to mean only a single item exclusive from other items in reference to a list of at least two items, then the use of "or" in such a list is to be interpreted as including (a) any single item in a list, (b) all the items in the list, or (c) any combination of the items in the list. Additionally, the term "comprising" is used throughout to mean including at least the recited feature(s) such that any greater number of the same features and/or types of other features and components are not precluded.

B. Sorting and/or Depositing Nanotubes

FIG. 1 is a schematic view illustrating an apparatus 10 for depositing nanotubes onto a workpiece 12 in accordance with an embodiment of the invention. In this embodiment, the apparatus 10 includes a vessel 20 configured to contain a deposition fluid, such as a solution 22 having a plurality of nanotubes 24. The deposition fluid can be a liquid solution for electrochemically depositing the nanotubes 24 onto the workpiece 12, and in this case the vessel 20 can be a fountain plater similar to the single-wafer fountain platers manufactured by Semitool, Inc. In other embodiments, the deposition fluid can be a gaseous solution containing the nanotubes 24, and in this case the vessel 20 can be configured into a vapor deposition chamber.

The apparatus 10 further includes a workpiece holder 30 having at least one electrical contact 32 configured to engage a surface of the workpiece 12, a counter-electrode 40 in the vessel 20, and a power supply 50 operatively coupled to the workpiece holder 30 and the counter-electrode 40. In operation the power supply 50 applies an electrical bias to the surface of the workpiece 12 and the counter-electrode 40 for generating an electrical field in the solution 22 that attaches the nanotubes 24 to the surface of the workpiece 12.

The apparatus 10 in the embodiment illustrated in FIG. 1 further includes a sorting unit 60 for sorting the nanotubes 24. The sorting unit 60 can be configured to sort a first portion of the nanotubes 24 from a second portion of the nanotubes 24 so that the desired nanotubes are deposited onto the workpiece 12. The sorting unit 60, for example, can be a separator that separates first nanotubes from second nanotubes. The first and second nanotubes can have different electrical properties (e.g., conductive, dielectric, semiconductive), magnetic properties, size, mass, and/or other characteristics that can distinguish the first nanotubes from the second nanotubes. For example, the first nanotubes can be single-walled nanotubes and the second nanotubes can be multi-walled nanotubes. In another example, the first nanotubes can be metallic and the second nanotubes can be dielectric or semiconductive, or the first nanotubes can be magnetic and the second nanotubes can be nonmagnetic. The sorting unit 60 can mechanically sort the first and second nanotubes from each other, or the sorting unit 60 can electrically and/or magnetically separate the first and second nanotubes from each other in addition to or in lieu of mechanical sorting. The sorting unit 60 is accordingly configured to preferentially isolate the first or second nanotubes from each other to selectively deposit one of the first or second nanotubes onto the workpiece 12.

The sorting unit 60 in the embodiment of the apparatus 10 illustrated in FIG. 1 can be a filter that filters out larger nanotubes to isolate smaller nanotubes for deposition onto the workpiece 12. The filter, for example, can be a mesh or a plate with holes in it that allows the desired size of nanotubes to pass through the filter for depositing only the smaller nanotubes onto the workpiece 12. It is expected that the embodiment of the sorting unit 60 illustrated in FIG. 1 is particularly useful for separating smaller diameter nanotubes (e.g., single-walled nanotubes) from larger diameter nanotubes (e.g., multi-walled nanotubes). The sorting unit 60 can also pre-align the nanotubes relative to the workpiece 12. The electrical field and the sorting unit 60 can accordingly operate together to deposit the nanotubes in a desired configuration. For example, the electrical field and the sorting unit 60 can operate together to arrange the nanotubes on the workpiece such that the nanotubes are at least generally parallel to each other and in a desired orientation relative to the surface of the workpiece 12.

The particular embodiment of the apparatus 10 shown in FIG. 1 operates by flowing the solution 22 through the vessel 20 such that the nanotubes 24 pass through the sorting unit 60. As explained above, the sorting unit 60 separates desired nanotubes from undesired nanotubes and pre-aligns the nanotubes 24 for plating onto the workpiece 12. The workpiece holder 30 holds the workpiece 12 in the solution 22, and the power supply 50 applies an electrical bias to the workpiece 12 and the counter-electrode 40 to generate the electrical field in the solution 22. The electrical field accordingly causes the nanotubes proximate to the surface of the workpiece 12 to become attached to the workpiece 12. In other embodiments, the workpiece 12 and counter-electrode 40 can be orientated vertically instead of horizontally. In still additional embodiments, the solution can be stagnant or stationary, and the nanotubes can move through the solution under the influence of gravity, an electrical field, a magnetic field, and/or an electromagnetic field.

One expected advantage of the apparatus 10 is that the sorting unit 60 sorts the nanotubes in a manner such that the desired types of nanotubes are deposited onto the workpiece 12. The sorting unit 60 can further pre-align the nanotubes so that they are in a better orientation to be arranged perpendicular to each other and at a desired angle relative to the surface of the workpiece 12. Another advantage of the apparatus 10 is that the electrical field further aligns the nanotubes relative to each other and causes the nanotubes to be attached to the surface of the workpiece 12 in a desired arrangement. As a result, several embodiments of the apparatus 10 are expected to provide controlled deposition of nanotubes for manufacturing transistors, interconnects, emitters, or other components in electrical and/or mechanical devices.

Figure 2:
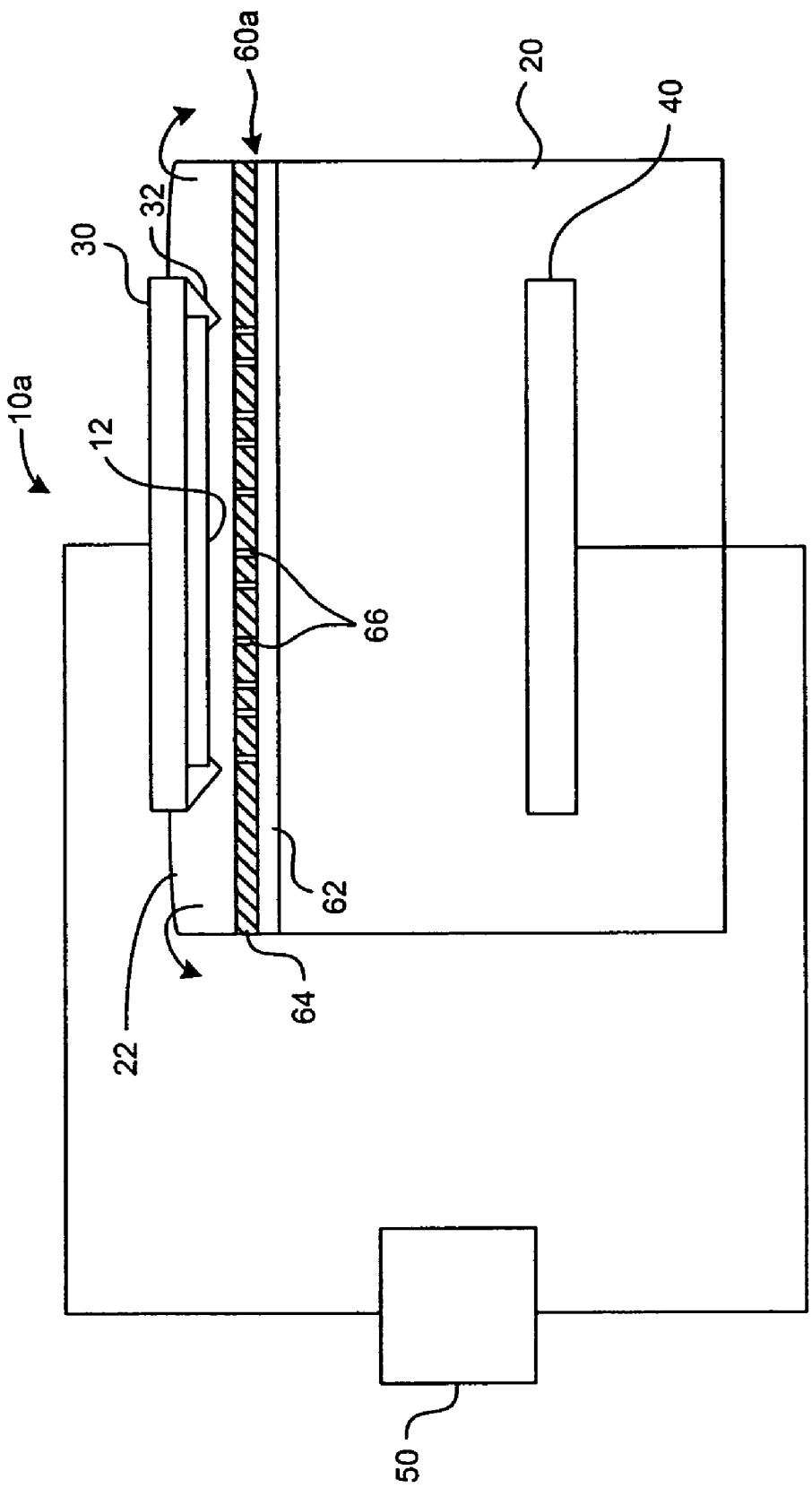
FIG. 2 is a schematic view illustrating a process for depositing nanotubes onto a workpiece in accordance with another embodiment of the invention.

FIG. 2 is a schematic view illustrating an apparatus 10a for sorting and depositing nanotubes onto microfeature workpieces in accordance with another embodiment of the invention. The apparatus 10 illustrated in FIG. 1 is similar to the apparatus 10a illustrated in FIG. 2, and thus like referenced numbers refer to like components in FIGS. 1 and 2. In one embodiment, the apparatus 10a includes a sorting unit 60a having a filter 62 and a mask 64. The filter 62 can be a mesh or another type of filter that separates first nanotubes from second nanotubes as described above. The mask 64 can be a plate or other member having a plurality of openings 66 through which the nanotubes can be deposited onto selected areas of the workpiece 12. For example, the mask 64 can include a pattern of openings 66 corresponding to the pattern of the array areas on the workpiece 12 to shield the peripheral regions on the workpiece 12 from the nanotubes. The sorting unit 60a is generally placed close to the workpiece 12 so that the openings 66 in the mask 64 are aligned with the desired areas of the workpiece 12. In operation, the desired nanotubes are driven through the filter 62 and through the openings 66 to be electrochemically deposited onto the surface of the workpiece 12.

In an alternative embodiment of the apparatus 10a shown in FIG. 2, the sorting unit 60a includes only the mask 64 (i.e., does not include the filter 62). In this embodiment, the mask 64 separates a first portion of the nanotubes from a second portion of the nanotubes by allowing only the portion of the nanotubes aligned with the openings 66 to be deposited onto the workpiece 12. As a result, the functionality of the sorting units is not limited to filtering one type of nanotube from another, but can alternatively include separating the same type of nanotubes from each other for selective deposition on desired areas of a workpiece.

Figure 3:
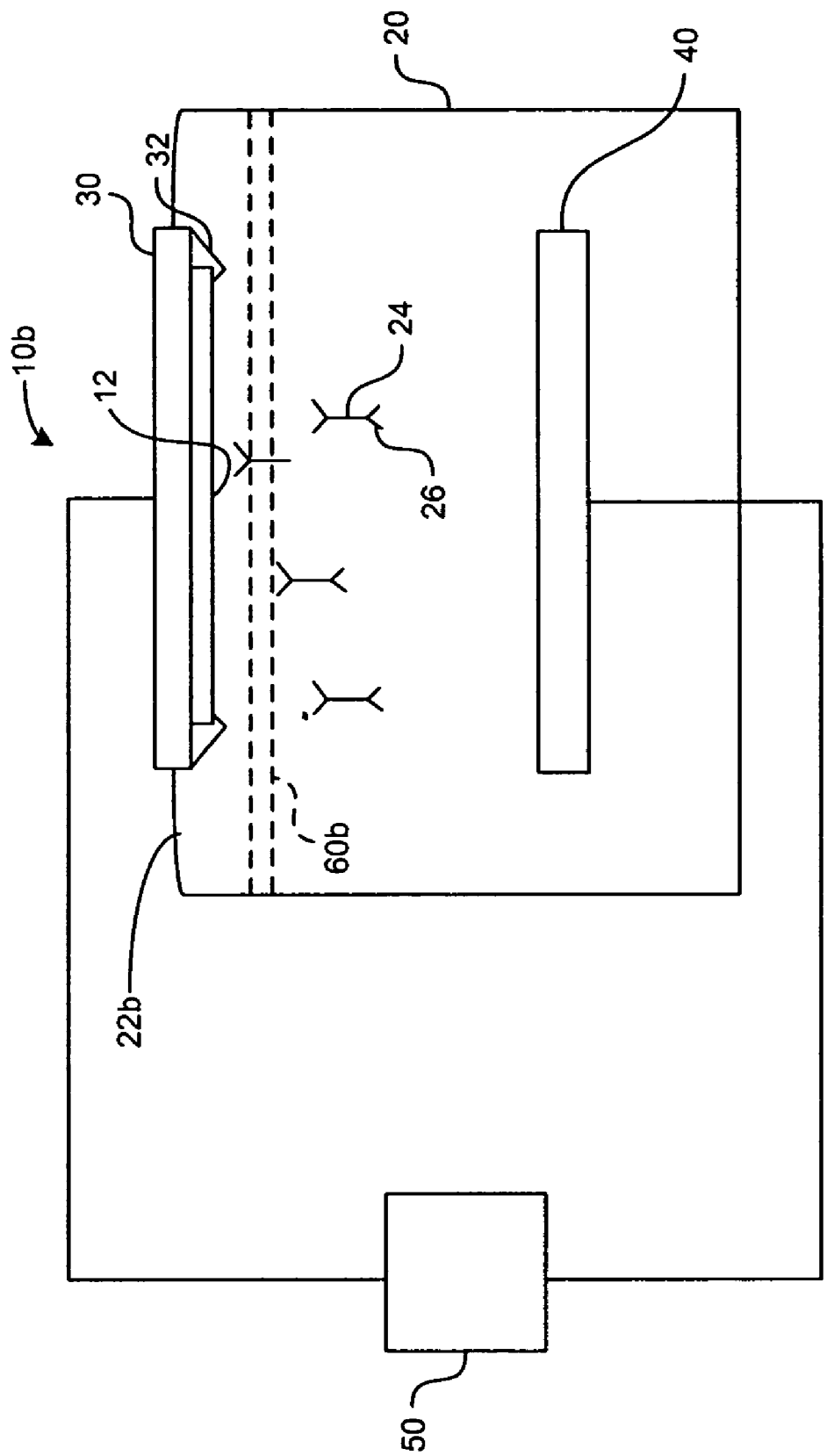
FIG. 3 is a schematic view illustrating a process for depositing nanotubes onto a workpiece in accordance with still another embodiment of the invention.

FIG. 3 is a schematic view illustrating an apparatus 10b for depositing carbon nanotubes onto a workpiece in accordance with another embodiment of the invention. The apparatus 10b is similar to the apparatus 10 and 10a illustrated in FIGS. 1 and 2, and thus like reference numbers refer to like components in FIGS. 1-3. The apparatus 10b includes a solution 22b having nanotubes 24 that have been functionalized by adding one or more functional molecules 26 (shown schematically) to the nanotubes 24. The functional molecules 26 have a specific property to (a) further facilitate the alignment of the nanotubes 24 to an electrical or electromagnetic field in the solution 22b and/or (b) further facilitate sorting a first type of nanotube from a second type of nanotube. The functional molecules 26 can impart a desired electrical property, chemical property, magnetic property, mass, size, density, or other characteristic to the nanotubes 24. The functional molecules 26 can preferentially or selectively functionalize different types of nanotubes (e.g., metallic, insulating, etc.) because of the different chemical interaction between the functional molecules 26 and the different types of nanotubes. For example, the nanotubes 24 can be functionalized with a suitable functional molecule 26 to provide a dipole structure that further enhances the orientation of the carbon nanotubes in the field between the workpiece 12 and the counter-electrode 40. The apparatus 10b can optionally include a sorting unit 60b for separating a first portion of the nanotubes from a second portion of the nanotubes. The optional sorting unit 60b can be one of the sorting units 60 or 60a described above with reference to FIGS. 1 and 2, or any of the other sorting units described below with reference to other embodiments of the invention.

Figure 4:
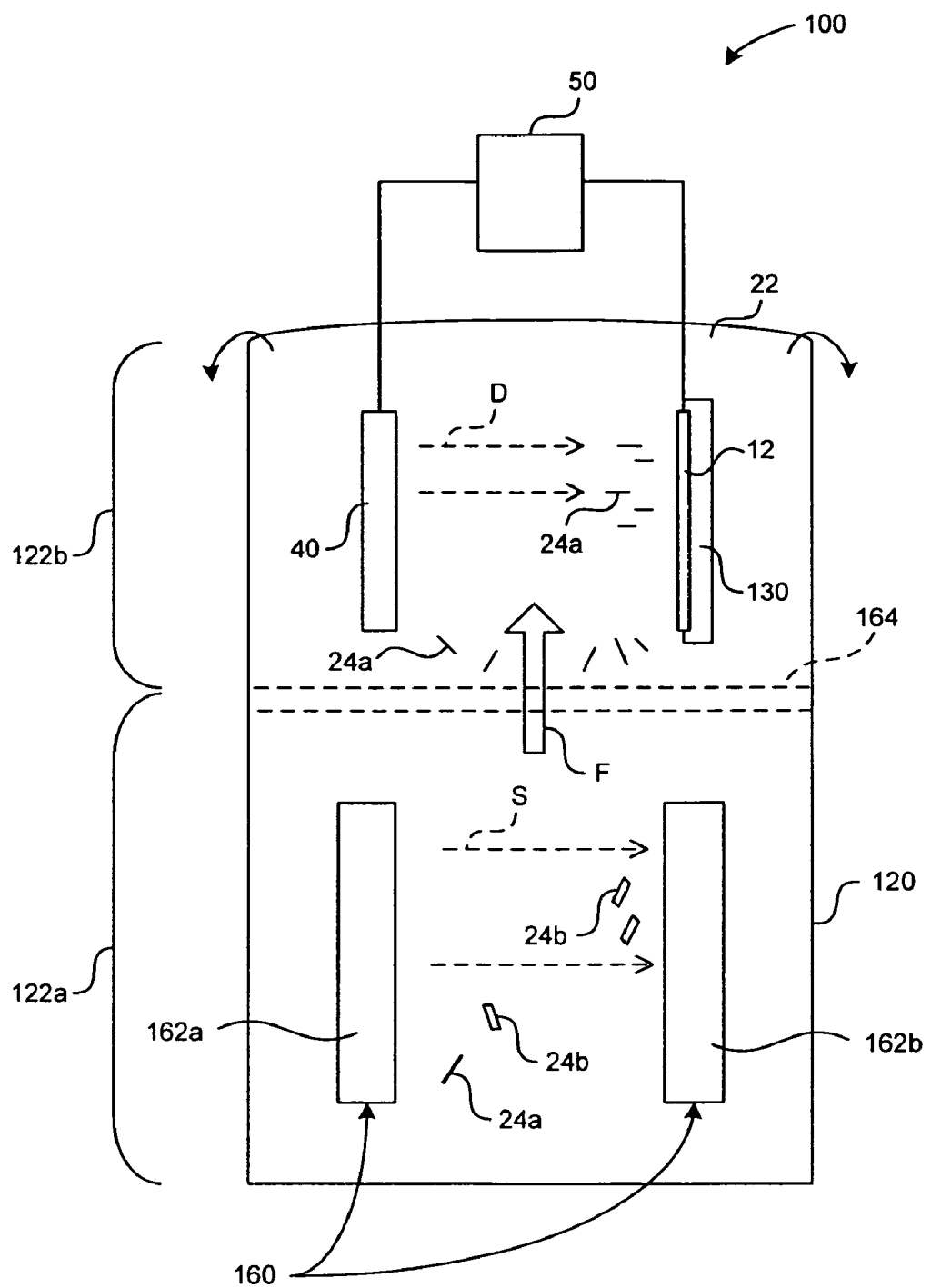
FIG. 4 is a schematic view illustrating a process for depositing nanotubes onto a workpiece in accordance with yet another embodiment of the invention.

FIG. 4 is a schematic view of an apparatus 100 for sorting and depositing carbon nanotubes onto microfeature workpieces in accordance with another embodiment of the invention. In this embodiment, the apparatus 100 includes a vessel 120 having a sorting zone 122a and a deposition zone 122b. The vessel 120 is configured to direct a flow F of the solution 22 through the sorting zone 122a and the deposition zone 122b. As explained in more detail below, the apparatus 100 sorts a first type of nanotube from a second type of nanotube in the sorting zone 122a, and then deposits the selected type of nanotube onto the workpiece 12 in the deposition zone 122b.

The apparatus 100 can further include a sorting unit 160 in the sorting zone 122a. In this embodiment, the sorting unit 160 is a field generator having a first element 162a and a second element 162b that generate a sorting field S transverse to the flow F of the solution 22 in the sorting zone 122a. The first and second elements 162a and 162b can be opposite poles of magnets, opposing electrodes, or electromagnets. The sorting unit 160 preferentially separates first nanotubes 24a from second nanotubes 24b such that the second nanotubes 24b generally remain in the sorting zone 122a and the first nanotubes 24a generally pass to the deposition zone 122b. As explained above with reference to FIG. 3, the nanotubes 24a and 24b can be functionalized such that the sorting unit 160 preferentially separates the second nanotubes 24b from the first nanotubes 24a using the separation field S. The sorting unit 160 can further include a mechanical separator 164, such as a filter, to further sort the nanotubes passing to the deposition zone 122b.

The apparatus 100 further includes a workpiece holder 130 that can be positioned in the deposition zone 122b and a counter-electrode 40 in the deposition zone 122b. The power supply 50 is operatively coupled to the workpiece holder 130 and the counter-electrode 40 to apply a first electrical potential to the workpiece 12 via the workpiece holder 130 and a second electrical potential to the counter-electrode 40 for establishing a deposition field D in the deposition zone 122b.

As a result, the first nanotubes 24a in the deposition zone 122b are deposited onto the surface of the workpiece 12.

Figure 5:
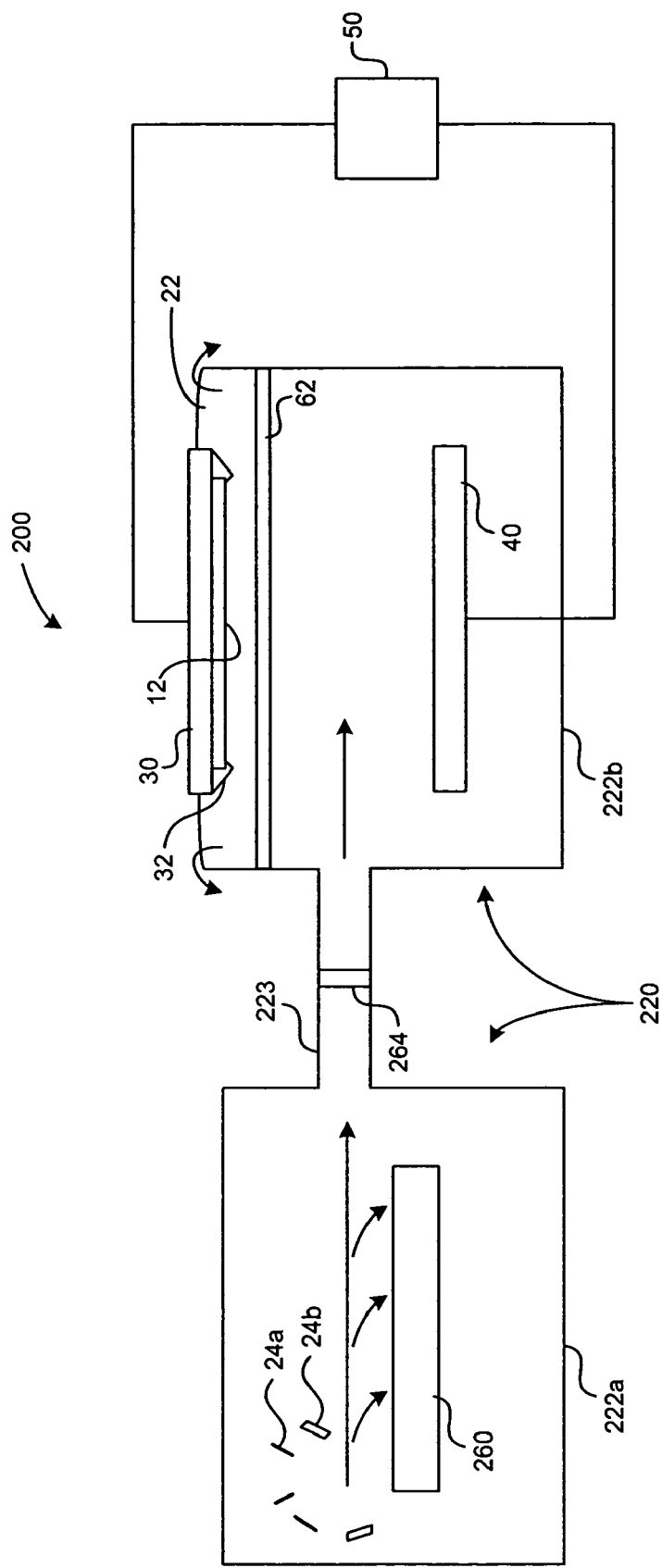
FIG. 5 is a schematic view illustrating a method for depositing nanotubes onto a workpiece in accordance with another embodiment of the invention.

FIG. 5 is a schematic view illustrating an apparatus 200 for sorting and depositing nanotubes onto microfeature workpieces in accordance with still another embodiment of the invention. In this embodiment, the apparatus 200 includes a vessel 220 having a sorting zone 222a, a deposition zone 222b separate from the sorting zone 222a, and a conduit 223 between the sorting zone 222a and the deposition zone 222b. The apparatus 200 also includes a sorting unit 260 in the sorting zone 222a for separating first nanotubes 24a from second nanotubes 24b. The sorting unit 260 can be a field generator having one or more elements for generating an electrical field, a magnetic field, or an electromagnetic field. The sorting unit 260, for example, can be an electromagnet or permanent magnet that selectively attracts the second type of nanotubes 24b in the solution 22. The sorting unit 260 can further include a filter or other type of mechanical separator 264 to further enhance the sorting of the nanotubes. The sorting unit 260 can alternatively be a catch basin that catches heavier or higher density nanotubes. The apparatus 200 can further include a workpiece holder 30, a counter-electrode 40, and a power supply 50 as described above with reference to FIG. 1. In operation, therefore, the sorting unit 260 separates a first portion of the nanotubes 24a from a second portion of the nanotubes 24b in the sorting zone 222a, and the power supply 50 generates a deposition field in the deposition zone 222b for depositing the desired nanotubes onto the surface of the workpiece 12.

From the foregoing, it will be appreciated that specific embodiments of the invention have been described herein for purposes of illustration, but that various modifications may be made without deviating from the spirit and scope of the invention. For example, features and components of the apparatus shown in FIGS. 1-5 can be combined with each other in additional embodiments. Additionally, the workpiece holder and counter-electrode arrangements can be vertical or horizontal in the various embodiments. Accordingly, the invention is not limited except as by the appended claims.

I claim:

1. A method of depositing nanotubes onto a workpiece, comprising:

contacting a surface of a semiconductor wafer with a deposition fluid containing a plurality of nanotubes;

separating a first portion of the nanotubes from a second portion of the nanotubes with a filter located between the contacted surface of the semiconductor wafer and a counter-electrode;

aligning the first portion of the nanotubes relative to the surface of the semiconductor wafer while the first portion of the nanotubes are separated from the second portion of the nanotubes; and establishing an energy field between the surface of the semiconductor wafer and the counter-electrode in the deposition fluid to deposit the separated and aligned first portion of the nanotubes onto the semiconductor wafer, wherein the energy field is at least one of an electric field and an electromagnetic field.

2. The method of claim 1 wherein:

the first portion of the nanotubes comprises first nanotubes having a first characteristic and the second portion of the nanotubes comprises second nanotubes having a second characteristic with different properties than the first characteristic; and separating the first portion of the nanotubes from the second portion of the nanotubes comprises sorting the first nanotubes from the second nanotubes in the deposition fluid.

3. The method of claim 2 wherein sorting the first nanotubes from the second nanotubes comprises filtering the second nanotubes from the first nanotubes.

4. The method of claim 2 wherein the filter includes a mesh, and wherein sorting the first nanotubes from the second nanotubes comprises passing the first nanotubes through the mesh that filters out the second nanotubes.

5. The method of claim 2 wherein sorting the first nanotubes from the second nanotubes comprises applying the energy field to the deposition fluid such that the energy field acts on the second nanotubes differently than the first nanotubes to segregate the first nanotubes from the second nanotubes.

6. The method of claim 2, further comprising providing a liquid flow of deposition fluid, and wherein applying the energy field comprises (a) generating a first electrical field in a first area of the flow that segregates the first nanotubes from the second nanotubes, and (b) generating a second electrical field in a second area of the flow that attaches the first nanotubes to the surface of the semiconductor wafer.

7. The method of claim 2, further comprising providing a liquid flow of deposition fluid, and wherein applying the energy field comprises (a) generating a magnetic field in a first area of the flow that segregates the first nanotubes from the second nanotubes, and (b) generating an electrical field in a second area of the flow that attaches the first nanotubes to the surface of the semiconductor wafer.

8. The method of claim 2 wherein the first nanotubes are single-walled nanotubes and the second nanotubes are multi-walled nanotubes.

9. The method of claim 2 wherein the first nanotubes are one of a conductor, dielectric, or a semiconductor, and wherein the second nanotubes are the other of a conductor, dielectric, or a semiconductor.

10. The method of claim 2 wherein the first nanotubes further include a functionalizing element that imparts the first characteristic to the first nanotubes, and wherein sorting the first nanotubes from the second nanotubes comprises applying the energy field to the deposition solution such that the energy field acts on the functionalizing element to segregate the first nanotubes from the second nanotubes.

11. The method of claim 2 wherein the second nanotubes further include a functionalizing element that imparts the second characteristic to the second nanotubes, and wherein sorting the first nanotubes from the second nanotubes comprises applying the energy field to the deposition solution such that the energy field acts on the functionalizing element to segregate the first nanotubes from the second nanotubes.

12. The method of claim 2 wherein sorting the first nanotubes from the second nanotubes comprises filtering the second nanotubes from the first nanotubes and then passing the first nanotubes through openings in a mask to deposit the first nanotubes onto selected areas of the semiconductor wafer.

13. The method of claim 1 wherein separating a first portion of the nanotubes from a second portion of the nanotubes in the deposition fluid comprises passing the first portion of the nanotubes through openings in a mask to deposit the first portion of the nanotubes onto selected areas of the semiconductor wafer.

14. A method of depositing nanotubes onto a semiconductor wafer from a deposition fluid containing first nanotubes having a first characteristic and second nanotubes having a second characteristic, the method comprising:

flowing the deposition fluid toward a surface of the semiconductor wafer in a deposition chamber, the deposition chamber further including a counter electrode spaced apart from the surface of the semiconductor wafer and a sorting unit between the surface of the semiconductor wafer and the counter electrode;

separating the first nanotubes from the second nanotubes as the deposition fluid flows past the sorting unit;

aligning the first nanotubes relative to the surface of the semiconductor wafer while the first nanotubes are separated from the second nanotubes;

applying an electric field between the surface of the semiconductor wafer and the counter-electrode in the deposition chamber; and electrochemically depositing the separated and aligned first nanotubes onto the surface of the semiconductor wafer with the applied electric field.

15. The method of claim 14 wherein electrochemically depositing the first nanotubes comprises plating the first nanotubes onto the surface of the semiconductor wafer with the applied electric field.

16. The method of claim 14 wherein separating the first nanotubes from the second nanotubes comprises filtering the second nanotubes from the first nanotubes.

17. The method of claim 14 wherein separating the first nanotubes from the second nanotubes comprises passing the first nanotubes through a filter that filters the second nanotubes from the first nanotubes.

18. The method of claim 14 wherein separating the first nanotubes from the second nanotubes comprises applying an energy field to the deposition fluid that acts on the second nanotubes differently than the first nanotubes.

19. The method of claim 14 wherein the first nanotubes are single-walled nanotubes and the second nanotubes are multi-walled nanotubes.

20. The method of claim 14 wherein the first nanotubes are conductive and the second nanotubes are dielectric or semi-conductive.

21. A method of depositing nanotubes onto a workpiece, comprising:
positioning a workpiece in a deposition chamber, the deposition chamber having a counter electrode spaced apart from a surface of the workpiece;
flowing a deposition fluid toward the surface of the workpiece in the deposition chamber, the deposition fluid containing first nanotubes having a first characteristic and second nanotubes having a second characteristic;
separating the first nanotubes from the second nanotubes using a sorting unit as the deposition fluid flows past the sorting unit, the sorting unit being between the surface of the workpiece and the counter electrode;
applying an electric field between the surface of the workpiece and the counter-electrode in the deposition chamber; and
plating the separated first nanotubes onto the surface of the workpiece with the applied electric field.

22. The method of claim 21 wherein:
the workpiece includes a semiconductor wafer;
positioning a workpiece in a deposition chamber includes:
supporting the semiconductor wafer with a workpiece holder;
positioning the workpiece holder such that a surface of the semiconductor wafer is in the deposition chamber and facing the counter electrode;
the first characteristic includes a first size of the first nanotubes;
the second characteristic includes a second size of the second nanotubes, the second size being larger than the first size;
the sorting unit includes at least one of a filter and a mesh;
separating the first nanotubes from the second nanotubes includes:
flowing the depositing fluid past the sorting unit;
filtering the second nanotubes from the depositing fluid while allowing the first nanotubes to pass through the sorting unit and flow toward the surface of the semiconductor wafer; and
plating the separated first nanotubes onto the surface of the workpiece includes:
aligning the separated first nanotubes in a desired alignment relative to one another with the applied electric field; and
attaching the separated first nanotubes to the surface of the semiconductor wafer in the desired alignment.

23. The method of claim 21 wherein:
the workpiece includes a semiconductor wafer;
positioning a workpiece in a deposition chamber includes:
supporting the semiconductor wafer with a workpiece holder;
positioning the workpiece holder such that a surface of the semiconductor wafer is in the deposition chamber and facing the counter electrode;
the first characteristic includes a first size of the first nanotubes;
the second characteristic includes a second size of the second nanotubes, the second size being larger than the first size;
the sorting unit includes at least one of a filter and a mesh;
separating the first nanotubes from the second nanotubes includes:
flowing the depositing fluid past the sorting unit;
filtering the second nanotubes from the depositing fluid while allowing the first nanotubes to pass through the sorting unit and flow toward the surface of the semiconductor wafer;
the depositing chamber further includes a mask between the surface of the semiconductor wafer and the sorting unit, the mask having a plurality of openings in a desired pattern;
plating the separated first nanotubes onto the surface of the workpiece includes:
aligning the separated first nanotubes in a desired alignment relative to one another with the applied electric field;
moving at least a portion of the separated first nanotubes through the openings of the mask toward the surface of the semiconductor wafer; and
attaching at least a portion of the separated first nanotubes to the surface of the semiconductor wafer in the desired alignment and in the desired pattern.

24. The method of claim 21 wherein:
the workpiece includes a semiconductor wafer;
positioning a workpiece in a deposition chamber includes:
supporting the semiconductor wafer with a workpiece holder;
positioning the workpiece holder such that a surface of the semiconductor wafer is in the deposition chamber and facing the counter electrode;
the first characteristic includes a first electrical characteristic;
the second characteristic includes a second electrical characteristic different than the first electric characteristic;
the electric field is a first electric field;

separating the first nanotubes from the second nanotubes includes:
  flowing the depositing fluid past the sorting unit;
  applying a second electric field to the first and second nanotubes as the depositing fluid flows past the sorting unit;
  collecting the second nanotubes from the depositing fluid with the second electric field while allowing the first nanotubes to pass through the sorting unit and flow toward the surface of the semiconductor wafer; and
plating the separated first nanotubes onto the surface of the workpiece includes:
  aligning the separated first nanotubes in a desired alignment relative to one another with the applied first electric field; and
  attaching the separated first nanotubes to the surface of the semiconductor wafer in the desired alignment.

25. The method of claim 21 wherein:
the workpiece includes a semiconductor wafer;
positioning a workpiece in a deposition chamber includes:
  supporting the semiconductor wafer with a workpiece holder;
  positioning the workpiece holder such that a surface of the semiconductor wafer is in the deposition chamber and facing the counter electrode;
the first nanotubes are single-walled nanotubes;
the second nanotubes are multi-walled nanotubes;
separating the first nanotubes from the second nanotubes includes:
  flowing the depositing fluid past the sorting unit;
  collecting the second nanotubes from the depositing fluid while allowing the first nanotubes to pass through the sorting unit and flow toward the surface of the semiconductor wafer; and
plating the separated first nanotubes onto the surface of the workpiece includes:
  aligning the separated first nanotubes in a desired alignment relative to one another with the applied first electric field; and
  attaching the separated first nanotubes to the surface of the semiconductor wafer in the desired alignment.

26. The method of claim 21 wherein:
the workpiece includes a semiconductor wafer;
positioning a workpiece in a deposition chamber includes:
  supporting the semiconductor wafer with a workpiece holder;
  positioning the workpiece holder such that a surface of the semiconductor wafer is in the deposition chamber and facing the counter electrode;
the first nanotubes are conductive;
the second nanotubes are dielectric or semiconductive;
the electric field is a first electric field;
separating the first nanotubes from the second nanotubes includes:
  flowing the depositing fluid past the sorting unit;
  applying a second electric field to the first and second nanotubes as the depositing fluid flows past the sorting unit;
  collecting the second nanotubes from the depositing fluid with the second electric field while allowing the first nanotubes to pass through the sorting unit and flow toward the surface of the semiconductor wafer; and
plating the separated first nanotubes onto the surface of the workpiece includes:
  aligning the separated first nanotubes in a desired alignment relative to one another with the applied first electric field; and
  attaching the separated first nanotubes to the surface of the semiconductor wafer in the desired alignment.

27. The method of claim 21 wherein separating the first nanotubes from the second nanotubes comprises filtering the second nanotubes from the first nanotubes.

28. The method of claim 21 wherein separating the first nanotubes from the second nanotubes comprises passing the first nanotubes through a mesh that filters out the second nanotubes.

29. The method of claim 21 wherein separating the first nanotubes from the second nanotubes comprises applying an electric field to the first and second nanotubes.

30. The method of claim 21 wherein applying the energy field comprises (a) generating a first electrical field in a first area of the flow that segregates the first nanotubes from the second nanotubes, and (b) generating a second electrical field in a second area of the flow that attaches the first nanotubes to the surface of the workpiece.

31. The method of claim 21 wherein the first nanotubes include a functionalizing element that imparts the first characteristic to the first nanotubes, and wherein separating the first nanotubes from the second nanotubes comprises applying the energy field to the deposition solution such that the energy field acts on the functionalizing element to segregate the first nanotubes from the second nanotubes.

* * * * *